United States Patent
Votaw et al.

(10) Patent No.: US 11,044,254 B2
(45) Date of Patent: Jun. 22, 2021

(54) DOCUMENT ORCHESTRATION SYSTEM FOR PROCESSING DIGITAL CONSENT INFORMATION

(71) Applicant: Bank of America Corporation, Charlotte, NC (US)

(72) Inventors: Elizabeth S. Votaw, Potomac, MD (US); David J. Smiddy, Chadds Ford, PA (US); FNU Sidharth, Charlotte, NC (US); Stephen T. Shannon, Charlotte, NC (US); James Alexander, Dripping Springs, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/733,305

(22) Filed: Jan. 3, 2020

(65) Prior Publication Data

US 2020/0213308 A1    Jul. 2, 2020

Related U.S. Application Data

(62) Division of application No. 15/644,777, filed on Jul. 8, 2017, now Pat. No. 10,567,380.

(51) Int. Cl.
*G06Q 20/38* (2012.01)
*G06F 21/62* (2013.01)
(Continued)

(52) U.S. Cl.
CPC .......... *H04L 63/0876* (2013.01); *G06F 21/31* (2013.01); *G06F 21/6218* (2013.01);
(Continued)

(58) Field of Classification Search
CPC ...... G06F 21/60; G06F 21/62; G06F 21/6218; G06F 21/6245; H04L 63/0876;
(Continued)

(56) References Cited

U.S. PATENT DOCUMENTS

| 6,105,007 A | 8/2000 | Norris |
| 7,228,357 B2 | 6/2007 | Plewnia |

(Continued)

OTHER PUBLICATIONS

"Digital Onboarding with Consent to Use Customer Data," http://www.trunomi.com/solving-online-account-opening/; Apr. 30, 2015.
(Continued)

*Primary Examiner* — Alexander Lagor
*Assistant Examiner* — D'Arcy Winston Straub
(74) *Attorney, Agent, or Firm* — Weiss & Arons LLP; Michael A. Springs Esq.

(57) ABSTRACT

Method and apparatus for allowing the changing of security values and consent data is provided. The security values allow for dynamically changing the security level and ease of access associated with performing specific transactions on specific accounts. The consent data may be pushed or pulled and when stored, may be used for future transactions, of both the same or a different type. The changing of security levels and consent data may be accomplished over the internet using mobile devices over both secure and non-secure networks.

18 Claims, 3 Drawing Sheets

(51) Int. Cl.
  *G06F 21/31*  (2013.01)
  *G06Q 50/18*  (2012.01)
  *H04L 29/06*  (2006.01)
  *G06Q 20/12*  (2012.01)
  *G06Q 40/02*  (2012.01)

(52) U.S. Cl.
  CPC ......... *G06F 21/6245* (2013.01); *G06Q 20/12* (2013.01); *G06Q 20/382* (2013.01); *G06Q 20/3829* (2013.01); *G06Q 20/38215* (2013.01); *H04L 63/0428* (2013.01); *G06Q 40/025* (2013.01); *G06Q 50/18* (2013.01); *G06Q 50/188* (2013.01); *H04L 63/102* (2013.01)

(58) Field of Classification Search
  CPC ....... H04L 63/10; H04L 63/102; G06Q 20/12; G06Q 20/38215; G06Q 20/3829; G06Q 40/025; G06Q 50/18
  See application file for complete search history.

(56) References Cited

U.S. PATENT DOCUMENTS

| | | | |
|---|---|---|---|
| 7,934,098 B1 | 4/2011 | Hahn et al. | |
| 8,191,776 B2 | 6/2012 | Ben-Zvi et al. | |
| 8,365,988 B1 | 2/2013 | Medina, III et al. | |
| 8,738,527 B2 | 5/2014 | Kalinichenko et al. | |
| 9,286,603 B2 | 3/2016 | Fung et al. | |
| 9,537,865 B1* | 1/2017 | Borovoy | H04L 63/108 |
| 10,554,677 B1* | 2/2020 | Mehta | H04L 63/102 |
| 2002/0138418 A1 | 9/2002 | Zarin et al. | |
| 2007/0208875 A1 | 9/2007 | Plewnia | |
| 2007/0244816 A1 | 10/2007 | Patni et al. | |
| 2010/0061294 A1* | 3/2010 | Proctor, Jr. | G06Q 30/0261 370/328 |
| 2014/0365353 A1* | 12/2014 | Shvarts | G06Q 40/025 705/38 |
| 2015/0317639 A1* | 11/2015 | Ward | G06Q 20/18 705/304 |
| 2016/0232534 A1 | 8/2016 | Lacey et al. | |

OTHER PUBLICATIONS

"GDPR, PSD2 & Eprivacy: New Regulations Will Drive Financial Services Innovation," http://www.trunomi.com/gdpr-psd2-eprivacy-new-regulations-will-drive-financial-services-inovation/. Mar. 13, 2017.

* cited by examiner

DOCUMENT ORCHESTRATION SYSTEM FOR PROCESSING DIGITAL CONSENT INFORMATION

CROSS REFERENCE TO RELATED APPLICATION

This application is a divisional of U.S. patent application Ser. No. 15/644,777 filed on Jul. 8, 2017 and entitled "DOCUMENT ORCHESTRATION SYSTEM CONSENT FOR PROCESSING DIGITAL INFORMATION" which is hereby incorporated by reference herein in its entirety.

FIELD OF TECHNOLOGY

This disclosure relates to data orchestration devices for computer systems. More specifically, this disclosure pertains to the use of a dynamic adjustments of transactional digital consent procedures in financial computer systems.

BACKGROUND OF THE INVENTION

Electronic commerce has improved the marketplace in many ways. Some of the improvements include providing access to remote geographic locations, reducing costs associated with real estate and personnel, eliminating travel expenses, better targeting of advertisements and marketing, better provision of relevant price and quality information, and 24-hour/day availability. These improvements are so profound that they have caused vendors and customers, who would otherwise have lacked market access, to enter the marketplace.

Unfortunately, electronic commerce has an innate contradiction that is difficult to resolve. Easier access to goods and services poses significant security risks. Hacking, credit card fraud, and identity theft are potent threats in an electronic commerce environment. Methods of remedying those security threats involve impinging on the very flexibility and ease that make electronic commerce so practical.

A particular technical challenge with electronic commerce relates to orchestrating consent requirements. Often before various transaction may occur, such as a financial center customer opening a deposit or credit card account, various consents must be obtained. Similarly, regulations often require that a follow up conversation may not occur unless the customer provides consent to receive such a follow up conversation. Typically, consents are not reliably captured either in writing or digitally. This means that each transaction process requires repeatedly asking for the same consent information over and over again.

As a result, there is clear utility in and benefit from, novel methods and apparatuses for balancing security risks and orchestrating consent requirements with transactional flexibility and ease.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only an exemplification of the principles of the invention and are not intended to limit the invention to the particular embodiments illustrated.

BRIEF SUMMARY

Figure 1:
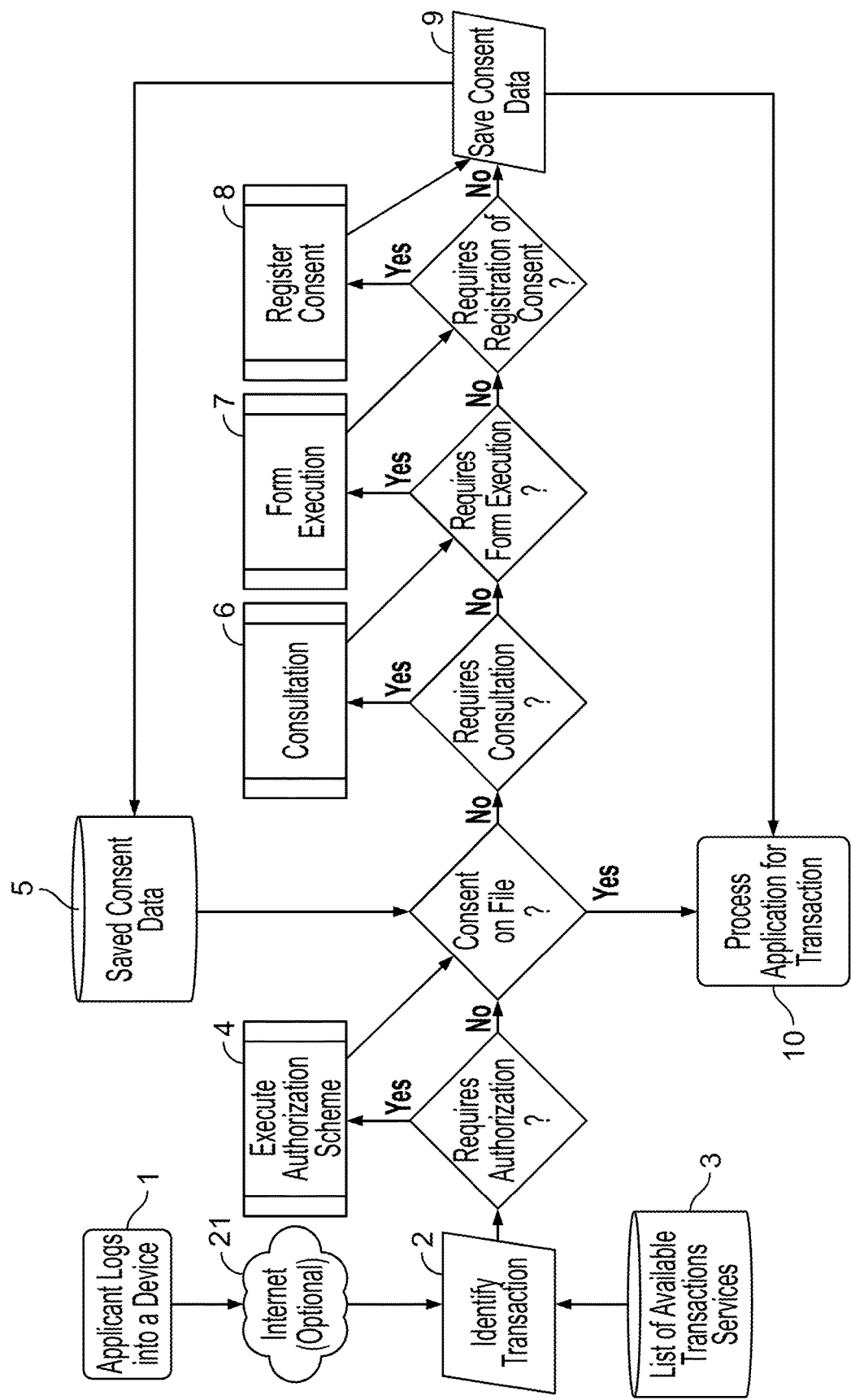
FIG. 1 is a flowchart illustrating a first embodiment of the disclosure.

To satisfy the unsolved technical needs identified above, embodiments are directed toward a system and a method for changing a consent level associated with a transaction conducted over an electronic commerce platform.

The method may comprise the steps of reactivating dormant system resources on a remote computer system, transferring a profile to the remote computer system, activating a consent scheme, activating a security scheme, transferring a second profile to the remote computer system, converting a desired replacement token into the pre-established security token when consent is present and when the generated security token meets a first predetermined criterion; and replacing the default security application with the non-default security application in the plurality of default security applications.

The reactivation of the dormant system resources may be required to execute, on a remote computer system, a plurality of default security applications. The resources may comprise electricity, processing power, and auxiliary systems.

The profile may contain a device identity, the device user, an account record, and a transaction scheme associated with the account record.

The consent scheme may comprise the steps of:

identifying information which must be disclosed to the device user prior to enacting the transaction scheme, determining if the information has previously been provided to the device user, and if not provided, transmitting the information to the device and storing a record of the transmission in the remote computer system;

identifying an interaction which must occur with the device user prior to enacting the transaction scheme, determining if the interaction has previously occurred with the device user, and if it has not occurred, initiating the interaction via the device and storing a record of the interaction in the remote computer system;

identifying a contract which must be executed via the device user prior to enacting the transaction scheme, determining if the contract has been executed previously via the device user, and if not executed, supplying a version of the contract to the device, executing the contract via the device, and storing a record of the executed contract in the remote computer system; and indicating that consent is present when records of all the required information, interaction, and contract, have been stored.

The security scheme may comprise the steps of:

when a pre-established security token is detected in the remote computer system, generating a security token by duplicating the pre-established security token;

when a pre-established security token is not detected in the remote computer system: generating a list of security applications associated with the identification, deactivating running system resources of security applications absent from the list, activating dormant system resources of non-running security applications present on the list, executing the active security applications and thereby assigning a validity weight to the identification, and generating a security token that is proportional to the validity weight of the identification.

The second profile may contain a desired replacement security token for the generated security token. The desired replacement token may be converted into the pre-established security token when consent is present and when the generated security token meets a first predetermined criterion. Over the course of a 30-day period, a default security application may be deactivated by the security scheme more times that a non-default security application may be activated by the security scheme, the default security application may be replaced with the non-default security application in the plurality of default security applications.

The method may further comprise transferring a third profile from the device logged onto the remote computer system, the profile containing an instruction to execute the selected transaction scheme, the computer system executing the transaction scheme when both the stored pre-established security token is within a second predetermined criterion and when consent is present.

The user may be a person without a pre-existing relationship with the remote computer system.

The interaction may comprise activating a security application comprising a voice over internet protocol teleconference connecting a consultant on a second device in informational communication with the remote computer system and a telephone service on the user device.

The information may be disclosed to the user by activating a security application comprising a voice over internet protocol teleconference establishing a telephone service with the user device and transmitting a verbal message over the telephone service.

The contract may be executed (a) via transmitting from the user device a scanned photograph of a hand signed contract to the remote computer system or (b) via electronic signature with an application running on the user device.

The validity weight of the identification may have a numerical value and the criterion may be whether the numerical value of the identification is at least a great as a value pre-determined for the combination of the device identity, the device user, the account record, and the transaction scheme.

Prior to transmitting the first profile, the device may reactivate system resources required to execute, on the device, a plurality of security applications, the resources comprising electricity, processing power, and auxiliary systems. Subsequent to transmitting the third signal, resources on the device are deactivated.

The transaction scheme may be one item selected from the group consisting of accepting a loan, rejecting a loan, transferring funds, receiving funds, transferring a title, receiving a title, rejecting a title change, rejecting receipt of funds, making a payment, associating another user with the record, disassociating another from with the record, executing a contract, recording a document, entering a comment, and any combination thereof.

The security applications may be software selected from the group consisting of: fingerprint recognition program, voice recognition program, iris recognition program, DNA recognition program, camera, facial recognition program, document recognition program, personal data confirmation, distributed database blockchain data confirmation, risk assessment program, behavior prediction program, bar code scanners, optical scanners, biomarker scanners, token identification scanner, magnetic scanner, card reader, x-ray scanner, transponder reader, and any combination thereof.

The validity weight may be assigned by assessing the proportional correspondence between additional information supplied to the software by the user and information retrieved by the security application.

The validity weight of the identification may result in a security token than cannot be within the first predetermined threshold.

The transaction scheme may require an asset allocation between the account record and a second account record. An active security application may generate data associated with the relationship between the account record and the second account record.

The security scheme may validate the identification prior to fashioning the security token via division multiplexing of an authorization token.

The method may comprise the steps of providing a database on a computer system accessible to a network domain; logging a device with signal processing capabilities into a network domain; pinging the computer system from the device via the network domain; activating a consent scheme on the remote computer system to determine if consent is present; activating a consent scheme on the remote computer system to determine if consent is present; calculating an access value; and granting bi-directional cross-filtering access to those records and authorizations having a security value no greater than the access value and when consent is present.

The database may be on a computer system configured to include customer data. The customer data may include a plurality of records searchable by filters and a plurality of authorizations for transactions executable against records associated therewith. Each record and each authorization may have a distinct security value. The system may bar all transactions from occurring except those in which the authorization on file in the database is positive and consent is present. The customer data may be protected with bi-directional cross-filtering dynamic security protocols.

The device, network domain, and user may be identified via asynchronous processing. The user identity may be identified via validation by an authorization token. The access value for the device may be calculated according to an algorithm using, at least in part, correlation of the collective identifications and identity validation.

The consent scheme may comprise the steps of:

identifying information which must be disclosed to the device user prior to enacting the transaction scheme, determining if the information has previously been provided to the device user, and if not provided, transmitting the information to the device and storing a record of the transmission in the computer system;

identifying an interaction which must occur with the device user prior to enacting the transaction scheme, determining if the interaction has previously occurred with the device user, and if it has not occurred, initiating the interaction via the device and storing a record of the interaction in the computer system;

identifying a contract which must be executed via the device user prior to enacting the transaction scheme, determining if the contract has been executed previously via the device user, and if not executed, supplying a version of the contract to the device, executing the contract via the device, and storing a record of the executed contract in the computer system; and indicating that consent is present when records of all the required information, interaction, and contract, have been stored.

The method may further comprise a prohibited list, the prohibited list comprising a list of device identities and user identities for which the security value will always be greater than the access value.

The device may be logged onto the network domain via an ISP server over the internet. The algorithm may also use data associated with the ISP server and login chain details to calculate the access value.

The device may be logged onto the network domain via an integrated component of the network domain.

The system comprises a database having stored therein a plurality of financial records corresponding to at least one client, and a computer system configured to grant a request to change a specific authorization protocol so long as no authorization protocol precludes changing the specific authorization protocol from either or both a device or a network environment and so long as the computer system transmits a request for authorization and an authorization granting reply for said request is received by the computer system.

The computer system may be configured to receive, via a communication medium: a validated identity of a user, a request to access at least one financial record, an identity of a device the request originates from, and an identity of a network environment the request originates from; and if not denied, to grant access to at least a portion of the requested financial record.

The computer system may be further configured to access at least one consent protocol. Each consent protocol may stipulate financial record-specific criteria governing access and changes to at least a portion of the financial record or of any one consent protocol. The computer system may be further configured to access at least one authorization protocol. Each authorization protocol may stipulate client-specific criteria governing access and changes to at least a portion of the financial record or of any one authorization protocol. The computer system may be further configured to deny access to the financial record if at least one authorization protocol precludes access to the financial record from the identity of either or both the device or the network environment. The computer system may be further configured to grant read-only access to at least a portion of the financial record if no authorization protocol precludes such read-only access from either or both the device or the network environment.

The authorization protocol may mandate denial of access in the event the identity of the device does not match at least one item on a pre-determined list of identified devices.

The consent protocol may comprise an information disclosure, a consultation interaction, a contract execution, and a third-party record registration.

DETAILED DESCRIPTION OF THE DISCLOSURE

"Device" means any electronic device used to transmit user input and process, store, transmit, and/or output data, and includes but is not limited to, personal computers, business computers, laptop computers, tablet devices, computer networks, software applications, web browsers, SMS devices, SMS software, email devices, email software, electronic data devices, cell phones, cell phone applications, firmware, websites, cloud-based processing, internet routers, web servers, computer terminals, PDAs, any component thereof, any device integrated with any of the aforementioned, and any combination thereof.

With the advent of electronic commerce, the need to efficiently manage consent requirements has come to fore. Often while various transactions are applied for, such as opening a deposit or credit card account, various consents must be provided. For example, certain legal disclosures may be required to be provided to a customer. Similarly, due to non-solicitation laws, certain services may not be provided unless the customer previously consented to receive access to the service.

In order to reconcile the desire for flexibility, ease, and convenience in e-commerce with the need for protection and security, digital authorization protocols have been developed. A digital authorization security protocol is an information scheme used by an e-commerce system which allocates how much ease or restriction should be applied to executing a given transaction. An authorization security value may control items including but not limited to: may such a transaction ever occur, how much validation or confirmation must be performed before processing the transaction, who may or may not perform a transaction, how often a transaction may occur, limits on the scale or value of the transaction, and under which conditions may the transaction occur.

At least one embodiment involves efficient access to consent data. For many transactions, there are steps that must be taken to ensure that specific disclosures have been made to and received by the customer. In those transactions, the consumer must have received the specific disclosures, and they must provide an explicit consent to proceed which references that the required disclosure has taken place. The requirements may arise from law, insurance obligation, or internal company policy. In some cases (such as with HIPAA—Health Insurance Portability and Accountability Act of 1996—controlled transactions) a first instrument must be executed before the process can begin (to obtain records) and a second instrument must also be executed for completion of the transaction. In some circumstances, the disclosure must include consultation with a person having specific credentials (such as an accountant, attorney, CPA (certified public accountant), corporate officer, financial fiduciary, or medical advocate).

In at least one embodiment, the system includes both elements for obtaining or generating particular consent data, and elements for retrieving previously provided consent data. The consent data may be retrieved and/or generated before and/or after an authorization process for the transaction has occurred. In one embodiment, the consent scheme may not commence until the prerequisite security scheme has been completed. In one embodiment, the security scheme may not commence until the prerequisite consent scheme has been completed.

FIG. 1 illustrates an embodiment for a consent using transaction processing system. A user 1 logs into a device for a service related to a particular transaction. The user may be a pre-existing customer of an entity or it may be a stranger accessing the system for the first time or an unregistered user. The device may access a computer system over the internet 21 or via another connection. The system has a list of possible transactions to choose from 3 and the user selects one 2. If appropriate for the user and/or the transaction, an authorization/security scheme 4 involving one or more various security applications is run. The security scheme assures that the transaction is being conducted with the bona fide permission of the true customer, is not fraudulent, is consistent with the agreed upon settings that the customer arranged with the financial institution, and complies with legal requirements and formalities. If appropriate for the user and/or the transaction, a consent scheme is run involving one or more applications. The consent scheme will determine if some or all of the required consents have been previously saved 5. If at least some needed consents are not previously saved or if they have expired or are otherwise invalid, new consent information is generated. The consent data may include consultation with a credentialed party 6, execution of a form or contract 7, display or provisions of details, terms, or disclosures, and registration of generated consent data with a third party 8. The generated consent data may then be saved for retrieval of relevant for future applications for the same or different transactions 9. If the authorization and consents schemes have been successfully traversed by the application process, the transaction may be executed 10.

The specific details of what processes are or are not included in a given consent scheme may depend on the specifics of the device identity, the user, and how exactly the device logged into the remote computer system.

Figure 2:
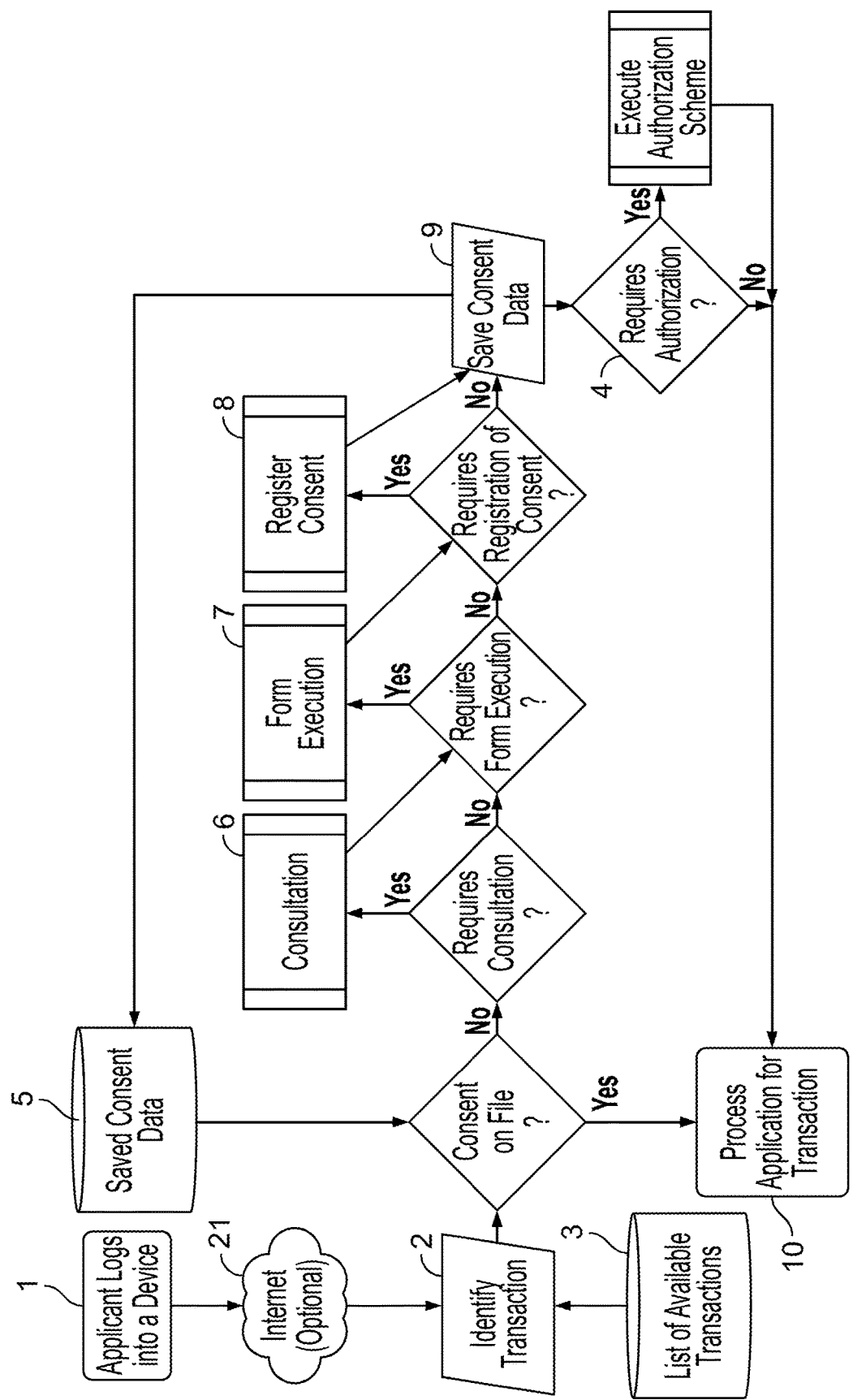
FIG. 2 is a flowchart illustrating a second embodiment of the disclosure.

In FIG. 1 the security scheme is a prerequisite to generating the consent data. As illustrated in FIG. 2, in at least one embodiment, the consent data is generated or retrieved prior to the authentication scheme. The generated or retrieved consent data however may also be "pinned" to the authentication scheme i.e. the consent data may be accessed by the security applications of the security scheme. The presence, absence, type, or quality of the consent data may be used by the security applications to increase or decrease the security value generated by the security applications.

FIG. 2 illustrates an embodiment for a transaction application system. A user 1 logs into a device for the purpose of requesting a transaction. The device may access a computer system over the internet 21 or via another connection. The system has a list of transactions to choose from 3 and the user selects one 2. If appropriate for the user and/or the transaction, a consent scheme is run involving one or more applications. The consent scheme will determine if some or all of the required consents have been previously saved 5. If at least some needed consents are not previously saved or if they have expired or are otherwise invalid, new consent information is generated. The consent data may include consultation with a credentialed party 6, execution of a form or contract 7, display or provisions of details, terms, or disclosures, and registration of generated consent data with a third party 8. The generated consent data may then be saved for retrieval of relevant for future applications for the same or different transaction 9. After performing the consent scheme, if appropriate for the user and/or the transaction, an authorization/security scheme 4 involving one or more various security applications is run. If the authorization and consents schemes have been successfully traversed by the application process, the transaction may then be executed 10.

Figure 3:
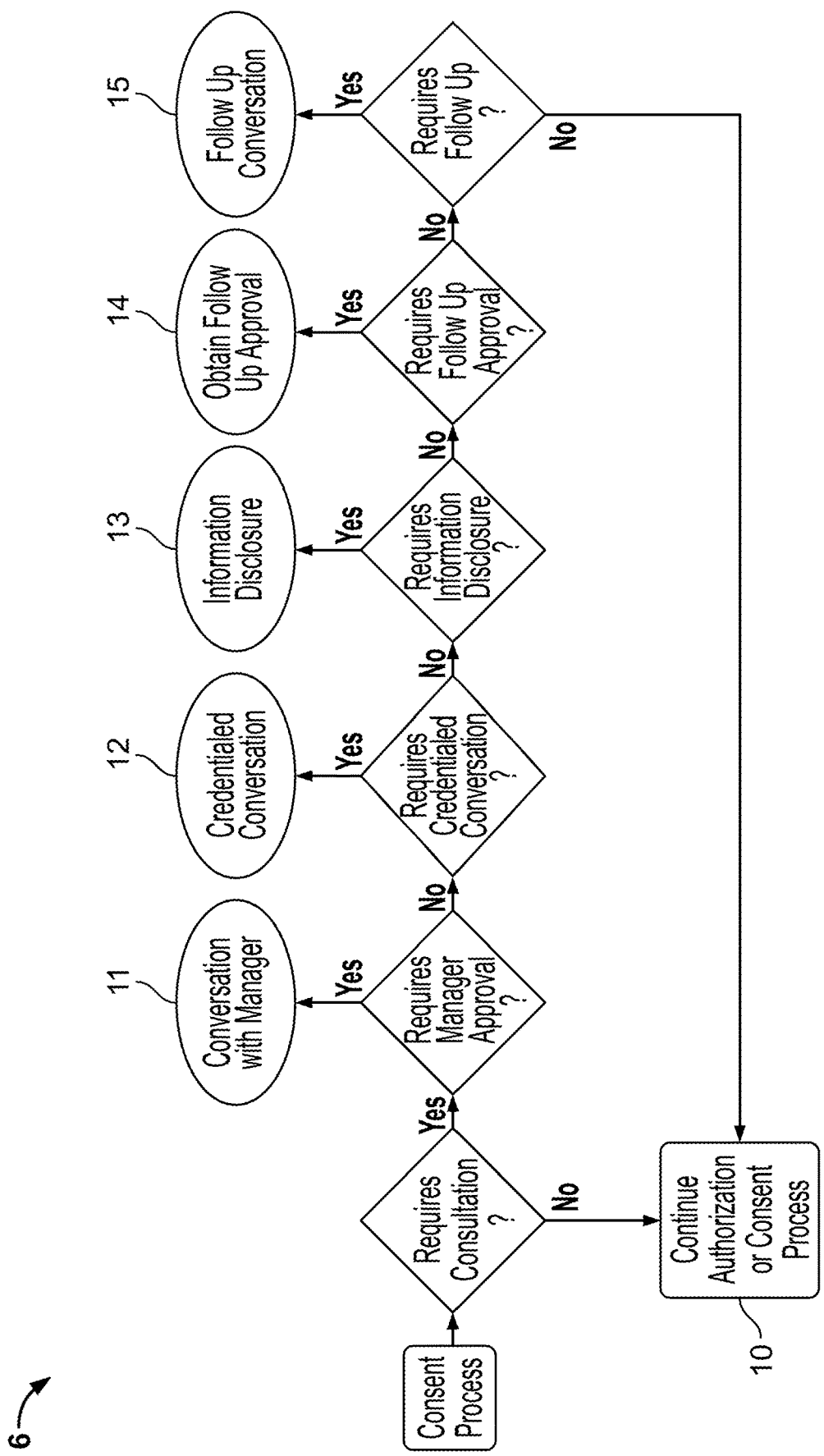
FIG. 3 is a flowchart illustrating a third embodiment of the disclosure.

FIG. 3 illustrates an embodiment of a consultation 6 with the user. In at least one embodiment, the consent requires a consultation interaction with a specific person. This may include a verbal conversation with manager level employee interacting briefly with the customer 11. This can also include contact with a credentialed person such as a doctor, lawyer, accountant, CPA (certified public accountant), corporate officer, notary public, medical advocate, guardian ad litem, legal guardian, . . . etc 12. This may take the form of reading specific information and having a human witness available to confirm that the customer received the disclosure 13. The consultation interaction may include authorization for a follow up interaction after the consent process or the security process has been performed 14 and may actually include one or more follow up conversations as well 15. If completed, further portions of the consent or security scheme may then continue.

In at least one embodiment, the consent requires the presentation of documents, text, or information to the user device. This may be contract terms (such as shrink wrap contracts, terms or conditions) or may be legal disclosures such as identifying parties in fact, laws (such as the truth in lending act or HIPPA disclosure rules), or other information. The system would have the required information for each transaction on file and would keep track of what, when, and how the information was supplied to the customer. The system may include requiring the customer to affirmatively indicate that they have seen and have read the supplied information.

In at least one embodiment, the consent data may include execution of a specific form, document, or contract via the user device. The system would provide the form, document, or contract to the customer and would either accept an electronic signature, a scanned copy of a hard copy hand signature, or may require the actual receipt (such as via mail or courier) of a signed hard copy or a notarized hard copy.

In at least one embodiment, the consent data may be registered with an outside entity upon receiving assent from the user device. This may involve filing items with a recorder's office, a court, a regulatory body, or any other third-party body of relevance to the transaction.

In at least one embodiment, various received consent data is stored and may be accessed again when the user makes subsequent applications for the same or other transactions.

The introduction or updating of consent data is referred to as "pushing" data. In at least one embodiment a user may "pull" data (i.e. remove data) from the remote computer system. This may involve deleting, redacting, setting a time for deletion, or otherwise reducing some or all of the consent data present on the remote computer system. In at least one embodiment the pulling of consent data is streamlined, i.e. it can be done with fewer or no prerequisite security schemes.

The consent data may be valid for a set period of time and then expire and require updating. In at least one embodiment, the set period of time is between 1 day and 20 years. In at least one embodiment, after the set period of time has elapsed, the consent data is automatically pulled.

In addition to consent information, the process may include an authentication scheme. This authentication scheme is dependent on the type of transaction and/or some or all of the identification information. Items that require authentication or consent or and may require specific values include but are not limited to identity, finances, residency, citizenship, employment, credit history, health status, health history, genetics, mental health, predispositions, purchase history, group memberships, affiliations, associations, attendance patterns, travel patterns, communication patterns, location, security clearance, criminal records, number and/or type of transaction requests made, presence on various databases, and any combination thereof. Similarly, different transaction requests may require different data values, degrees of validation, or cross confirmation.

In at least one embodiment, a user using a device signals a computer system storing account and transaction information to change a security value for the account and transaction. The computer system may use a previously established security value or a security scheme utilizing one or more security applications to determine if the security value may be changed. Thus, the security value may be set to always prevent remote changes to itself or to the consent data, prevent remote changes to itself or the consent data unless a number of security tests are passed, and/or prevent remote changes to itself or the consent data until certain conditions or criteria have occurred.

In at least one embodiment, a pre-determined threshold is established for the type of request (which account, which transaction) and a security value is generated for the nature of the requestor (the user, the device, and the nature of the connection) based on the security scheme. If the security value is within the threshold the request is granted. If not the request is denied.

In at least one embodiment, the nature of the asset allocation innate to the proposed transaction may influence the value of the generated security value. For example, if the allocation involves a transfer of one or more assets into an account also owned by the user, widely known to serve a reputable function (such as a tax collection account), consistent with patterns expected of the user, or owned by a highly reputed agency (such as a regularly audited company), this may push the generated security value closer to the threshold. In contrast, if the transfer is into an account known to be disfavored by or contrary to the interests of the user, in a jurisdiction prone to illegal financial activity, known to be associated with criminal endeavors, or contrary to patterns expected of the user, this may push the generated security value farther from the threshold.

The need for a multiplicity of security applications to determine if a request to change a security value or consent data should be honored also imposes an operations burden. Parallel processing of numerous security applications requires inputs of additional resources such as electricity, processing power, and auxiliary systems. Furthermore, reactivation of deactivated security applications requires time and start up resources. Thus, the computer system as whole will be far more efficient, managed, and responsive if it has the proper security applications active when needed and has them deactivated when not needed.

In at least one embodiment, the computer system maintains a default list of the security applications to be executed prior to the first signal transmission. The default list may be maintained by adding to the list security applications more frequently used by the security scheme and removing from the list security applications less frequently used by the security scheme. In at least one embodiment, the computer system's maintained default lists and the addition or removal therefrom also includes security applications that are associated with the consent scheme.

In at least one embodiment, a security scheme is operated to properly enact the running of some security applications prior to user requests and other security applications are only activated after user requests have been made. This may be accomplished by the maintenance of a priority list of security applications. An application high enough on the list will be running in the background prior to a user request. Applications lower down on the list are only activated after a request has been made. An application's relative position on the list may increase in response to increases in one or more of: frequency of the application's use in prior consent requests, time required to complete activation of the application, magnitude of resource investments required for activation of the application, anticipation of requests requiring that particular application, compatibility problems with other applications due to sequence of activations, and any combination thereof. System resources availability may determine how large and how many of the applications on the list may be in operation prior to a user request.

In at least one embodiment the request to change a security value stored in a computer system is enacted via a device. The device may be remote (in a location outside of a facility controlled by the owner/operator of the computer system) or it may be local (within a facility controlled by the owner/operator of the computer system). A local device may be an integrated component of the computer system. For example, it may be an ATM machine disconnected from any other computer system and hardwire connected to the computer system. It may also be via a data port within a bank office subject to physical control over who and what accesses it.

The device transfers a signal to the computer system via a hard-wired connection, a broadcast connection, or any combination thereof. The signal may be transmitted in part via an internet connection. The signal may identify a purported user, an account, and a transaction. The signal may also include internet connection information such as the device's local IP address, WAN address, ISP address, DNS entered, data packet flow path, and any combination thereof. The signal may also indicate how the device is connected, i.e. via a public, private, or secured WIFI tether, modem, or other. Thus one level of security scrutiny may be result when the signal indicates the user is logging in from a secure network and a different level is due when logging in from an insecure network.

The signal may also include information regarding the specific hardware used for any portion of the connection including but not limited to the specific device, modem, ISP server, or the various packet transferring servers. Any and all of this information may be utilized by a security application to determine if the security consent value allows for a change by the requesting entity. The signal may include identification information comprising at least the device identity, the device user, an account record, and a transaction scheme associated with the account record.

In at least one embodiment, the computer system activates a security scheme to assess whether to allow for a change to the security value or not. One portion of the scheme is to determine if the purported user actually has authority to access the identified account and if not reject any request to change the consent security value. If so authorized, a next step would be to determine if both the account and the user are authorized to perform the selected transaction on the account. This may not be a binary matter as times, frequencies, and amounts may affect the degree of authority. If the purported user under current circumstances is authorized to conduct the transaction on the account, the security scheme then performs a targeted security check using specific security applications.

In at least one embodiment, a pre-established security value determines the scrutiny needed to change the security value. Different security applications may involve different degrees of reliability and validation. The more security applications used or the use of more reliable security applications result in a higher probability of accurate determination of the probity of authorizing a transaction. In addition, different security applications may be more or less suitable for different circumstances. For example, a scanner validating a picture ID may be highly probative if the user is from a jurisdiction having low incidences of ID counterfeiting and less probative if the user is from a jurisdiction having high incidences of ID counterfeiting. The security scheme may be tailored to take into account both gross veracity of each security application in general, and fine focusing of specific applications especially valuable to specific users, accounts, or transactions. For example, if the transaction is a home loan, a valid driver's license might simply be a general identification validation. For an auto loan however, this general information may not be sufficient and fine focusing on item such especially relevant information such as motor vehicle department driving records history may be appropriate for the security scheme.

In at least one embodiment, the higher the security value, the security application screenings must succeed before an approval is given to change the consent security value. In at least one embodiment, the higher the security value the more reliable the security application must be before an approval is given to change the consent security value.

The security applications may be software selected from the group consisting of: biometric validation such as a fingerprint recognition program, voice recognition program, iris recognition program, DNA (deoxyribonucleic acid) recognition program, MRI (magnetic resonance imager), biomarker scanners, and facial recognition program. The applications may involve a document recognition program, personal data confirmation, or a camera image being compared to a stored value. The software may utilize such features as a distributed database blockchain data confirmation, risk assessment program, behavior prediction program, bar code scanner, optical scanner, and token identification scanner, magnetic scanner, fax receiver, text reader, OCR (optical character reader), card reader, x-ray scanner, and transponder reader. Also, any combination of any item of these groups may also be utilized.

The security applications receive a source of input and output generated data. The generated data either increases or decreases the resulting generated consent security value. The generated data may be selected from the group consisting of validation or in-validation of: biometric data, pre-authorized device identity, consistency with selected transactions, information in a regulatory agency, information in picture ID, consistency with asset value threshold, consistency with number of transaction thresholds, consistency with number of consent value change thresholds, consistency between user and account authority, with and any combination thereof.

Subsequent to processing the security scheme, the computer system may deactivate some active applications and activate some deactivated applications to assume the optimal initial resource using resting state for processing future request.

The account may be any data item in a computer system containing a record capable of being the object of a commercial transaction. This includes but is not limited to bank back office systems, vendor systems, bank accounts, client facing systems, order entry systems, inventory systems, supply chain systems, customer rewards systems, point of sale systems, and bank payment systems. Different account types may have different consent security values.

The transaction scheme may be one item selected from the group consisting of accepting a loan, rejecting a loan, transferring funds, receiving funds, transferring a property title, receiving a property title, rejecting a title change, rejecting receipt of funds, making a payment, creating an escrow, withdrawing funds from an escrow, transferring out funds form an escrow, associating another user with the account, disassociating another from with the account, executing a contract, recording a document within a registry (such as a deed in a recorder of deeds or a car title in a department of motor vehicles), entering a comment to be associated with the account, and any combination thereof. Different transaction types may have different consent security values.

In at least one embodiment, the request to change the security value or the consent data may be initially rejected but subject to subsequent approval. For example, an initial request may involve a number of security applications that do not generate data supporting the request. There may then be an option to run more intrusive additional security applications whose approval may override the intimal rejection.

After performing the security scheme, a third signal may be transmitted from the device logged onto the remote computer system. The signal may contain a request to execute the selected transaction scheme. The computer system may execute the transaction scheme when the stored pre-established security value is within a second predetermined threshold and when consent has been properly established. The threshold to change the security value may be stricter or looser than the threshold to execute the transaction.

In addition to economizing on the use of resources on the computer system, resources on the device may also be optimally economized. The activation of applications on the phone or the computer system involved in the security scheme or consent scheme may involve an interactive sequence in which neither of the device or computer activates a particular application unless a perquisite reciprocal application is activated on the respective opposite computer or device. As many devices, especially cell phones, are battery operated and have limited processing capabilities, economic resource use on then is even more valuable. This need for economy may be even more acute when considering that much of the software and hardware required to generate input for the security applications (such as microphones, cameras, touch pads) actually run on the resource poor device.

In at least one embodiment, the transaction scheme requires an asset allocation between the account record and a second account record. An active security application may generate data associated with the relationship between the account record and the second account record. The security scheme may further comprise referencing a prohibited list. The prohibited list may comprise a list of account records for which the security scheme will always generate a consent security value than cannot be within the first or second predetermined threshold. The security scheme may further comprise referencing a permitted list. The permitted list may comprise a list of account records for which the security scheme will always generate a consent security value within the first or second predetermined threshold. Permitted lists and prohibited lists may also be formed respectively pre-approving or barring specific devices, users, login details, and transactions.

In at least one embodiment, one or more portions of the computer system may operate according to asynchronous processing. Asynchronous refers to processes that do not depend on each other's outcome, and can therefore occur on different threads simultaneously. It is the opposite of synchronous processing where each application waits for one to complete before the next begins. One or more or a portion of one or more of the security scheme, security application, transaction scheme, consent scheme, and signal processing, may operate independent of each other. As a result, the computer system may generate an initial consent security value, and as various asynchronous processing operations complete, they will input and alter the generated consent security value or threshold value.

The security scheme may further comprise validating the identification information via division multiplexing of an authorization token. Division multiplexing is a technique in which multiple data signals are combined for simultaneous transmission via a shared communication medium. It often involves a common carrier signal containing a combination of multiple modulated signals of discreetly separable data streams. The components of the identification data and/or the signal may be transmitted to the computer system via division multiplexing.

The multiplexing may also comprise an authorization token. An authorization token is a data item generated after concluding a successful validation of access authority. Once the token has been obtained, the user can offer the token, for a limited time, for repeated access without the need to revalidate after each communication. The authorization token may be embedded within the multiplexed signal. The authorization token for example may be included within a subsequent request to change a consent data, security value, or within a request to execute a transaction.

In at least one embodiment, when sending the signal, the user is unknown to the computer system. This may occur for example when a user wishes to set up an account in the expectation of executing a transaction from the account (for example setting up a bank account then using the bank account to purchase a house). The system may generate a default consent security value for unknown users or may use other criteria such as source of funds or validations of identity to raise or lower the consent security value.

In at least one embodiment, the security scheme may further comprise the involvement of a human being. A human may be needed to validate the identity or location of a user or otherwise provide input to the process before a security consent value may be changed.

The computer system may have a processor for controlling the operation of associated components, and may include RAM, ROM, input/output modules and a memory. The processor may also execute all software running on the computer—e.g., the operating system. Other components commonly used for computers such as EEPROM or Flash memory or any other suitable components may also be part of the computer system.

The memory of the computer system may be comprised of any suitable permanent storage technology—e.g., a hard drive or cloud based storage. The memory stores software, including the operating system of any application(s), along with any data needed for the operation of the computer system. Alternatively, some or all of computer executable instructions may be embodied in hardware or firmware. The computer executes the instructions embodied by the software to perform various functions.

The computer system may be connected to other computer systems via a local area network (LAN), a wide area network (WAN), or other network arrangement. The system may operate in a networked environment supporting connections to one or more remote computers, such as terminals, personal computers, or servers that include many or all of the elements described above relative to system. The network may be interconnected via adaptors, modems, or other communication medium including the internet.

It will be appreciated that any known network connections or other means of establishing a communications link between the computers may be used. The existence of any of various well-known protocols such as TCP/IP, Ethernet, FTP, HTTP and the like is presumed, and the system can be operated in a client-server configuration to permit a user to retrieve applications such as web pages from a web-based server. Any of various conventional web browsers can be used to display and manipulate data on web pages.

The computer system may also include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; logical processing device, which may compute data structural information, structural parameters of the directed graph and/or language model and machine-readable memory. Components of the computer system may be coupled together by a system bus or other interconnections and may be present on one or more circuit boards. In some embodiments, the components may be integrated into a single chip. The chip may be silicon-based.

While this invention may be embodied in many different forms, there are described in detail herein specific preferred embodiments of the invention. The present disclosure is an exemplification of the principles of the invention and is not intended to limit the invention to the particular embodiments illustrated. All patents mentioned herein or mentioned, are incorporated by reference in their entirety. Furthermore, the invention encompasses any possible combination of some or all of the various embodiments described herein and/or incorporated herein. In addition, the invention encompasses any possible combination that also specifically excludes any one or some of the various embodiments described herein and/or incorporated herein.

The above disclosure is intended to be illustrative and not exhaustive. This description will suggest, many variations and alternatives to one of ordinary skill in this art. All the alternatives and variations are intended to be included within the scope of the claims where the term "comprising" means "including, but not limited to". Those familiar with the art may recognize other equivalents to the specific embodiments described herein which equivalents are also intended to be encompassed by the claims.

Those skilled in the art may recognize other equivalents to the specific embodiment described herein which equivalents are intended to be encompassed by the claims attached hereto.

What is claimed is:

1. A method of organizing consumer consent information, the method comprising:
   providing a database on a computer system configured to include customer data, the customer data including a plurality of records searchable by filters, and a plurality of authorizations for transactions executable against records associated therewith, each record and each authorization having a distinct security value, the computer system barring all transactions from occurring except those in which the authorization on file in the database is positive and consent is present;
   protecting the customer data with bi-directional cross-filtering dynamic security protocols;
   logging a device with signal processing capabilities into a network domain;
   pinging the computer system from the device via the network domain;
   via asynchronous processing, identifying the device, identifying the network domain, and identifying a user of the device;
   via time division multiplexing, determining if the identity of the device user has been validated by an authorization token;

calculating an access value for the device according to an algorithm using, at least in part, correlation of the collective identifications and identity validation;
activating a consent scheme on the computer system, the consent scheme comprising the steps of:
identifying required information which must be disclosed to the device user prior to enacting a transaction scheme based on the device identity, determining if the required information has previously been provided to the device user, and if not provided, transmitting the required information to the device and storing a record of the required information and transmission thereof in the computer system;
identifying an interaction which must occur with the device user prior to enacting the transaction scheme based on the device identity, determining if the interaction has previously occurred with the device user, and if it has not occurred, initiating the interaction via the device and storing a record of the interaction in the computer system;
identifying a contract which must be executed via the device user prior to enacting the transaction scheme based on the device identity, determining if the contract has been executed previously via the device user, and if not executed, supplying a version of the contract to the device, executing the contract via the device, and storing a record of the executed contract in the computer system; and
indicating that consent is present when records of all the required information, interaction, and contract, have been stored;
transferring a first profile from the device to the computer system, the first profile containing the device identity, the device user, an account record, and the transaction scheme, wherein the transaction scheme is also based on the account record;
activating a security scheme on the computer system, wherein the security scheme comprises:
when a pre-established security token is detected in the computer system, generating a security token by duplicating the pre-established security token; and
when a pre-established security token is not detected in the remote computer system:
generating a list of security applications associated with the first profile;
deactivating running system resources of security applications absent from the list;
activating dormant system resources of non-running security applications present on the list;
executing the active security applications and thereby assigning a validity weight to the first profile; and
generating a security token that is proportional to the validity weight of the first profile; and
granting bi-directional cross-filtering access to those records and authorizations having a security value no greater than the access value and when consent is present.

2. The method of claim 1 wherein the security scheme validates the first profile prior to generating the security token via division multiplexing of an authorization token.

3. The method of claim 1 wherein the security applications are software selected from the group consisting of: fingerprint recognition program, voice recognition program, iris recognition program, DNA recognition program, camera, facial recognition program, document recognition program, personal data confirmation, distributed database blockchain data confirmation, risk assessment program, behavior prediction program, bar code scanners, optical scanners, biomarker scanners, token identification scanner, magnetic scanner, card reader, x-ray scanner, transponder reader, and any combination thereof.

4. The method of claim 3 wherein the validity weight is assigned by assessing proportional correspondence between additional information supplied to the software by the device user and one or more records retrieved by the security application from the database.

5. The method of claim 1 wherein, prior to transmitting the first profile, the device reactivates system resources required to execute, on the device, a plurality of security applications, the resources comprising electricity, processing power, and auxiliary systems, and, subsequent to processing the security scheme, deactivates the resources.

6. The method of claim 1, further comprising:
transferring a second profile to the computer system, the second profile containing a replacement security token for the generated security token;
converting the replacement token into the pre-established security token when consent is present and when the generated security token meets a first predetermined criterion; and
when, over the course of a 30-day period, a default security application is deactivated by the security scheme more times than a non-default security application is activated by the security scheme, replacing the default security application with the non-default security application in the plurality of default security applications.

7. The method of claim 6, further comprising transferring a third profile to the computer system, the third profile containing an instruction to execute the transaction scheme, the computer system executing the transaction scheme when both the security token is within a second predetermined criterion and when consent is present.

8. The method of claim 6, wherein the validity weight of the first profile has a numerical value and the first predetermined criterion is whether the numerical value of the first profile is at least a great as a value pre-determined for the combination of the device identity, the device user, the account record, and the transaction scheme.

9. The method of claim 6 wherein the validity weight of the first profile results in generating the security token that cannot be within the first predetermined criterion.

10. The method of claim 1 further comprising a blacklist, the blacklist comprising a list of device identities and user identities for which the security value will always be greater than the access value.

11. The method of claim 1 wherein the device is logged onto the network domain via an ISP server over the internet, the algorithm also using data associated with the ISP server and login chain details to calculate the access value.

12. The method of claim 1 wherein the device is logged onto the network domain via an integrated component of the network domain.

13. The method of claim 1 wherein the interaction comprises activating a security application comprising a voice over internet protocol teleconference connecting a consultant on a second device in informational communication with the computer system and a telephone service on the device.

14. The method of claim 1 wherein the interaction is disclosed to the device user by activating a security application comprising a voice over internet protocol teleconference establishing a telephone service with the device and transmitting a verbal message over the telephone service.

15. The method of claim 1 wherein the contract is executed (a) via transmitting from the device a scanned photograph of a hand signed contract to the computer system or (b) via electronic signature with an application running on the device.

16. The method of claim 1 wherein the transaction scheme is one item selected from the group consisting of: accepting a loan, rejecting a loan, transferring funds, receiving funds, transferring a title, receiving a title, rejecting a title change, rejecting receipt of funds, making a payment, associating another user with the record, disassociating another user from the record, executing a contract, recording a document, entering a comment, and any combination thereof.

17. The method of claim 1, further comprising reactivating dormant system resources required to execute, on the computer system, a plurality of default security applications, the resources comprising electricity, processing power, and auxiliary systems.

18. The method of claim 1 wherein the transaction scheme requires an asset allocation between the account record and a second account record and an active security application generates data associated with the relationship between the account record and the second account record.

* * * * *